United States Patent

Dávila et al.

[11] Patent Number: 5,758,540
[45] Date of Patent: Jun. 2, 1998

[54] RETROFIT DEVICE AND METHOD FOR ALTERING THE VOLUMETRIC RATIO OF CHAMBERS IN A FLUID MEASURING DEVICE

[75] Inventors: Joaquín R. Dávila, Atlanta; W. Andrew Harvill, Roswell, both of Ga.

[73] Assignee: The Coca-Cola Company, Atlanta, Ga.

[21] Appl. No.: 689,039

[22] Filed: Jul. 30, 1996

[51] Int. Cl.$^6$ ............................................. G01F 19/00
[52] U.S. Cl. ................................. 73/428; 73/426
[58] Field of Search .............................. 33/722, 723, 724, 33/725, 726, 727, 728, 729, 730, 731; 73/426, 427, 428, 429; 141/95, 325

[56] References Cited

U.S. PATENT DOCUMENTS

| | | | |
|---|---|---|---|
| 645,875 | 3/1900 | Strauss | 73/428 |
| 2,695,453 | 11/1954 | Valentine | 33/726 |
| 2,839,928 | 6/1958 | Fohrman | 73/429 |
| 2,982,446 | 5/1961 | Liolios et al. | 222/129.4 |
| 3,827,610 | 8/1974 | Stiefel, Jr. | 222/440 |
| 3,948,105 | 4/1976 | Johnson, Jr. | 73/427 |
| 3,982,282 | 9/1976 | Kong | 4/415 |
| 4,293,008 | 10/1981 | Coleman | 73/427 |
| 4,550,602 | 11/1985 | Burke, Sr. et al. | 73/428 |
| 4,721,393 | 1/1988 | Kwast | 73/426 X |
| 5,406,995 | 4/1995 | Gantzer | 141/325 |
| 5,566,465 | 10/1996 | Zoellner et al. | 33/723 |

FOREIGN PATENT DOCUMENTS

| | | | |
|---|---|---|---|
| 841037 | 6/1952 | Germany | 73/428 |

*Primary Examiner*—William A. Cuchlinski, Jr.
*Assistant Examiner*—Willie Morris Worth

[57] ABSTRACT

A retrofit device includes an elongated displacement element of uniform cross-section. When disposed in an upright position in a chamber of a multi-chamber fluid measuring device, the retrofit device reduces the volume of the chamber and thereby alters the ratio which the volume of that chamber bears to another chamber of the measuring device. The retrofit device may be advantageously employed in a syrup chamber of a multi-chamber measuring vessel used for assessing the volumetric ratio of syrup and diluent components used to prepare a beverage in a post-mix dispenser.

29 Claims, 1 Drawing Sheet

RETROFIT DEVICE AND METHOD FOR ALTERING THE VOLUMETRIC RATIO OF CHAMBERS IN A FLUID MEASURING DEVICE

BACKGROUND OF THE INVENTION

The present invention relates to a retrofit device and a method for altering the ratio of the volumes of chambers in a fluid measuring device. More particularly, the present invention relates to a retrofit device and method for reducing the volume of a chamber of a multi-chamber fluid measuring device to thereby alter the ratio of the volume of that chamber with respect to the volume of another chamber in the measuring device. The retrofit device and the method are particularly applicable to multi-chamber measuring vessels employed for assessing the volumetric ratio of syrup and diluent components used to prepare a beverage in a post-mix dispenser.

A known multi-chamber measuring device used to assess the ratio of syrup and diluent post-mix beverage components comprises a vessel with two or more open-top chambers of the same depth and differing cross-sections which are uniform at all levels within the chambers. When used to test the volumetric diluent-to-syrup ratio of a post-mix dispenser, the chambers separately and simultaneously receive the diluent and syrup flowing from the dispenser. If the chambers fill to the same, or nearly the same, level, the diluent-to-syrup volumetric ratio is determined to be within specification. If the chambers fill to significantly different levels, the diluent-to-syrup volumetric ratio is determined to be outside of specification and corrective action to adjust the flow of one or both of the beverage components in the dispenser will be needed.

Many of the different beverages prepared in post-mix dispensers require different diluent-to-syrup volumetric ratios, with an attendant requirement for separate fluid measuring devices having appropriately sized chambers. At an installation where many different beverages are dispensed from post-mix dispensers, the storage of the different measuring devices can be troublesome, and the expense can be significant.

A simple and inexpensive means for adapting a multi-chamber fluid measuring device for use with beverage components forming several different beverages of differing diluent-to-syrup volumetric ratios would eliminate the need for separate measuring devices, thus reducing the problems in storing the devices and reducing costs. Such a means for adapting a multi-chamber fluid measuring device for versatile use would be advantageous and most welcome.

OBJECTS AND SUMMARY OF THE INVENTION

Accordingly, it is a primary object of the present invention to provide a small, easily stored retrofit device of simple and inexpensive construction for adapting a multi-chamber fluid measuring device for use in assessing several different volumetric fluid ratios.

It is another object of the present invention to provide a retrofit device for altering the ratio of the volumes in a multi-chamber fluid measuring device for use with syrups and diluents used to prepare several different beverages.

It is another object of the present invention to provide a multi-chamber fluid measuring device equipped with a retrofit device for altering the ratio of the chambers.

It is another object of the present invention to provide a method for easily altering the ratio of the volumes in a multi-chamber fluid measuring device so that the measuring device may be used for assessing a several different volumetric fluid ratios.

The foregoing objects of the present invention and others as well are fulfilled by providing a retrofit device for reducing the volume of a chamber of a fluid measuring device having at least two open-top chambers of substantially the same depth and different cross-sectional areas, to thereby alter the ratio which the volumes of the at least two chambers bear to each other, the device comprising: an elongated displacement element having a length which is substantially the same as the depth of the at least two chambers, the displacement element being of substantially uniform cross-section throughout its length; a retaining element attached to an end of the displacement element for retaining the displacement element in an upright position within one of the at least two chambers; and indicia carried on the retrofit device designating the altered ratio of the volumes of the at least two chambers.

The objects of the present invention are also fulfilled by providing in combination: a fluid measuring device having at least two open-top chambers of substantially the same depth and different cross-sectional areas; and a retrofit device for altering the ratio which the volumes of the at least two chambers bear to each other, the device comprising an elongated displacement element of uniform cross-section disposed in an upright position within one of the at least two chambers.

The objects of the present invention are also fulfilled by providing a method for reducing the volume of a chamber of a fluid measuring device having at least two open-top chambers of substantially the same depth and different cross-sectional areas, to thereby alter the ratio which the volumes of the at least two chambers bear to each other, the method comprising the steps of: preparing an elongated displacement element having (1) a length which is substantially the same as the depth of the at least two chambers and (2) substantially uniform cross-section throughout its length; applying indicia to the retrofit device designating the altered ratio of the volumes of the at least two chambers; and disposing the displacement element of the retrofit device in an upright position within one of the at least two chambers.

A preferred embodiment of the present invention further includes a hook-like formation adapted to extend over the top edge of a sidewall of one of the at least two chambers for releasably retaining the retrofit device to the chamber sidewall.

Also in a preferred embodiment, the hook-like formation includes a panel carrying the indicia designating the altered ratio of the volumes of the at least two chambers.

A preferred embodiment of the present invention also includes in a surface of the hook-like formation a recess adapted to receive a raised formation on a sidewall of one of the at least two chambers.

The comprehensive scope of the present invention will become apparent from the detailed description which follows. It should be understood, however, that the specific embodiments disclosed are offered by way of illustration only, and various changes and modifications within the spirit and scope of the invention may become apparent to persons of ordinary skill in the art who have had the benefit of this disclosure.

BRIEF DESCRIPTION OF THE DRAWINGS

The detailed description refers to the following drawings, wherein.

DETAILED DESCRIPTION OF PREFERRED EMBODIMENTS

Figure 1:
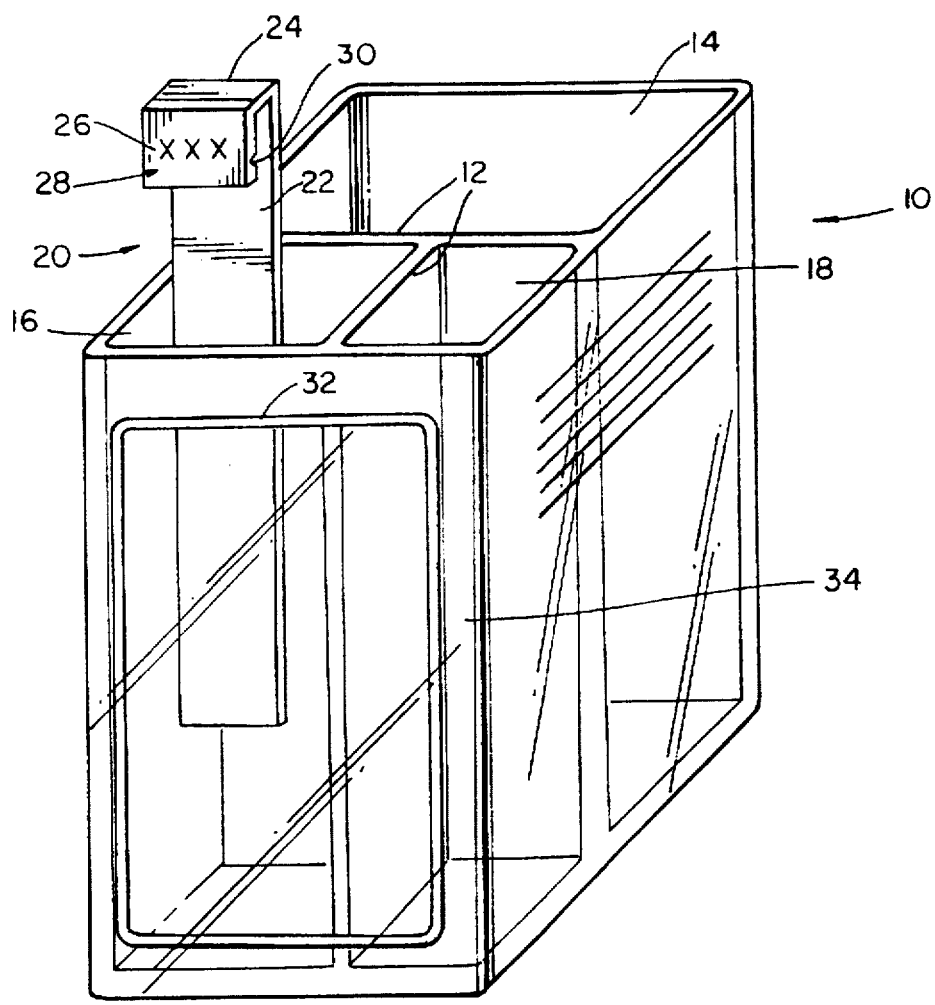
FIG. 1 illustrates the retrofit volume-altering device of the present invention in partially assembled relation with a multi-chamber fluid measuring vessel.

As illustrated in FIG. 1, a known device for measuring the volumetric ratio of syrup and diluent beverage components comprises a vessel 10 with interior partitioning 12 defining three chambers 14, 16, 18 each of different volume defined by the same depth and cross-sections of different area which are substantially uniform at all levels within the chambers.

The largest of the three chambers 14 is sized to receive the diluent component of the beverage dispensed from a post-mix dispenser. Each of the smaller chambers 16 and 18 is sized to receive the syrup component. For assessing the volumetric ratio of components in well known post-mix beverages, the ratio of the volume of the diluent chamber to the volumes of the two syrup chambers might, for example, be 5.75 to 1 and 4.75 to 1. As already noted, these volumes are defined by the same chamber depth and different cross-sectional areas.

A retrofit element 20, shown partially installed in syrup chamber 16, includes an elongated displacement element 22 which is substantially equal in length to the depth of the chambers in the measuring vessel. Throughout its length, the displacement element is of uniform cross-section. As illustrated, the displacement element has a thin rectangular cross-section. The displacement element may, however, be round, square or of other uniform cross-sectional shape.

When fully installed within a chamber of the multi-chamber vessel, the retrofit device will extend to the bottom of the chamber in an upright position and will reduce the cross-sectional area of the chamber by the same amount at all levels. Thus at any fill level, the fill volume will be reduced by the same fraction. By way of example, if the volumetric ratio of diluent chamber 14 to syrup chamber 16 is initially 4.75 to 1, installing in the syrup chamber a retrofit device with a displacement element having a cross-sectional area equal to five one-hundredths of the cross-sectional area of the syrup chamber will alter the volumetric ratio of the two chambers for all fill levels to 5.0 to 1.

A hook-like element 24 at an end of the displacement element is adapted to extend over the top edge of a sidewall of a syrup chamber in the multi-chamber measuring vessel, to thereby retain the retrofit device with its displacement element in an upright position within the chamber.

A surface on the hook-like element presents a panel 26 to which is applied indicia 28 designating an altered ratio of the diluent chamber volume with respect to the volume of the syrup chamber in which the retrofit device is disposed. Preferably, on panel 26 or elsewhere, the retrofit device will carry indicia designating the size of the syrup chamber which is to receive the retrofit device.

Figure 2:
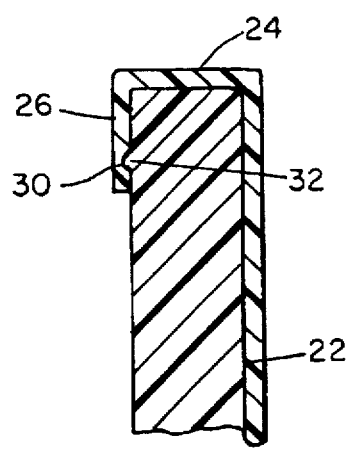
FIG. 2 illustrates in cross-section the disposition of the retrofit device and a chamber sidewall of the multi-chamber fluid measuring vessel.

To more positively retain the retrofit device within the chamber, a recess 30 may be formed in an inside surface of the hook-like element. As best illustrated in FIG. 2, the recess is adapted to receive a raised formation 32 defining a decal panel on sidewall 34 of the multi-chamber vessel. Other means, adhesives or magnets, perhaps, may be used to retain and position the retrofit device within a chamber of the multi-chamber vessel.

Modifications and variations of the invention which would be obvious to persons of ordinary skill who have had the benefit of this disclosure are not to be regarded as departures from the spirit and scope of the invention, as defined in the following claims.

What is claimed is:

1. An apparatus for reducing the volume of a first chamber of a fluid measuring device having at least one other chamber to thereby alter the ratio which the volumes of at least two of the chambers bear to each other, the apparatus comprising:

a displacement element which is insertable into the first chamber to thereby reduce the volume of the chamber which can be occupied by a fluid;

positioning means, engageable with a top edge of a sidewall of the first chamber, for positioning the displacement element in the first chamber; and means for indicating the altered ratio of the at least two chambers.

2. The apparatus as recited in claim 1, wherein the displacement element comprises an elongated element and wherein the positioning means holds the elongated element in an upright position in the first chamber.

3. The apparatus as recited in claim 1, wherein the displacement element comprises an elongated element having a substantially uniform cross-sectional area throughout its length.

4. The apparatus as recited in claim 3, wherein each of the at least two chambers are of substantially the same depth and different cross-sectional areas and wherein the displacement element is at least as long as the depth of the first chamber.

5. The apparatus as recited in claim 1, wherein the positioning means comprises a hook-like formation carried by the displacement element and adapted to extend over and receive the top edge of the sidewall of the first chamber for releasably retaining the displacement element to the chamber sidewall.

6. The apparatus as recited in claim 5, wherein a surface of the hook-like formation includes a recess adapted to receive a raised formation on the fluid measuring device.

7. The apparatus as recited in claim 5, further comprising means for identifying a displacement element for use with a selected fluid in the first chamber.

8. The apparatus as recited in claim 7, wherein the means for indicating and the means for identifying comprise indicia carried by the displacement element.

9. The apparatus as recited in claim 8, wherein the hook-like formation includes a panel carrying the indicia.

10. In combination:

a fluid measuring device having a first chamber and at least one other chamber; and a retrofit device for altering a ratio which volumes of at least two of the chambers bear to each other, the retrofit device comprising:

a displacement element which is insertable into the first chamber to thereby reduce the volume of the chamber which can be occupied by a fluid;

positioning means, engageable with a top edge of a sidewall of the first chamber, for positioning the displacement element in the first chamber; and means for indicating the altered ratio of the at least two chambers.

11. The combination as recited in claim 10, wherein the displacement element includes a portion thereof which has a uniform cross-sectional area and which is insertable into the first chamber.

12. The combination as recited in claim 10, wherein the positioning means comprises a hook-like formation carried by the displacement element and adapted to extend over and receive the top edge of the sidewall of the first chamber for releasably retaining the displacement element to the chamber sidewall.

13. The combination as recited in claim 12, further comprising means on the retrofit device for identifying a retrofit device for use with a selected fluid in the one chamber.

14. The apparatus as recited in claim 13, wherein the means for indicating and the means for identifying comprise indicia carried by the displacement element.

15. The combination as recited in claim 11, wherein the displacement element comprises an elongated member having a uniform cross-sectional area throughout its length.

16. The combination as recited in claim 15, wherein the at least two chambers each have the same depth and the elongated member is at least as long as the depth of the chambers.

17. The combination as recited in claim 14, wherein the hook-like formation includes a panel carrying the indicia.

18. The combination as recited in claim 12, wherein a sidewall of the first chamber has a raised formation adjacent a top edge thereof and wherein the hook-like formation has a recess adapted to receive the raised formation and thereby releasably retain the retrofit device to the first chamber sidewall.

19. The combination as recited in claim 10, wherein the at least two chambers are sized to separately receive a syrup and a diluent used to prepare a post-mix beverage, and the first chamber receives the syrup and is the smaller of the at least two chambers.

20. A method for reducing the volume of a first chamber of a fluid measuring device having at least one other chamber to thereby alter the ratio which the volumes of at least two of the chambers bear to each other, comprising the steps of:

(a) inserting a retrofit device having a displacement element into the first chamber to thereby reduce the volume of the chamber which can be occupied by a fluid;

(b) employing positioning means, engageable with a top edge of a sidewall of the first chamber, for positioning the displacement element in the first chamber; and (c) employing means incorporated into the retrofit device for indicating the altered ratio of the at least two chambers.

21. The method recited in claim 20, wherein step (b) further comprises releasably retaining the displacement element in the first chamber using a hook-like formation carried by the displacement element which extends over and receives the top edge of the sidewall of the first chamber.

22. The method recited in claim 20, wherein at least a portion of the displacement element has a uniform cross-sectional area and wherein step (a) further comprises inserting the portion of the displacement element having the uniform cross-sectional area into the first chamber.

23. The method recited in claim 22, wherein during step (a), the displacement element is inserted in an upright orientation in the first chamber.

24. The method recited in claim 22, wherein the displacement element is an elongated element with the uniform cross-sectional area along the length thereof, and wherein step (a) further comprises engaging a bottom of the first chamber with an end of the displacement element, the displacement element being at least as long as a depth of the first chamber such that the displacement element extends entirely through the depth of the first chamber.

25. The method recited in claim 21, wherein the hook-like formation has a recess formed therein and wherein a raised formation is provided on a sidewall of the fluid measuring device, and wherein step (b) further comprises placing the hook-like formation so that the raised formation fits into the recess in the hook-like formation.

26. The method recited in claim 25, further comprising the step of (d) employing means incorporated into the retrofit device for designating a retrofit device for use with a selected fluid in the first chamber.

27. The method recited in claim 26, wherein steps (c) and (d) are carried out by providing indicia on the retrofit device.

28. The method recited in claim 20, wherein the chambers include a chamber sized to receive a syrup and a chamber sized to received a diluent with the syrup and diluent being used to prepare a post-mix beverage and wherein step (a) comprises inserting the displacement element into the chamber which receives the syrup.

29. The method recited in claim 21, wherein:

each of the chambers are of substantially the same depth and different cross-sectional areas;

at least a portion of the displacement element has a uniform cross-sectional area;

step (a) comprises inserting the displacement element into the the first chamber with the portion of the displacement element having the uniform cross-sectional area being placed into the first chamber; and the method further comprises the step of releasably retaining the retrofit device in the first chamber.

* * * * *